US011485854B2

(12) United States Patent
Ueda et al.

(10) Patent No.: US 11,485,854 B2
(45) Date of Patent: Nov. 1, 2022

(54) THERMOPLASTIC RESIN COMPOSITION AND MOLDED ARTICLE THEREOF

(71) Applicant: Toray Industries, Inc., Tokyo (JP)

(72) Inventors: Takashi Ueda, Ichihara (JP); Masanori Kobayashi, Ichihara (JP); Daisuke Sato, Ichihara (JP)

(73) Assignee: Toray Industries, Inc., Tokyo (JP)

(*) Notice: Subject to any disclaimer, the term of this patent is extended or adjusted under 35 U.S.C. 154(b) by 0 days.

(21) Appl. No.: 17/598,235

(22) PCT Filed: Mar. 23, 2020

(86) PCT No.: PCT/JP2020/012795
§ 371 (c)(1),
(2) Date: Sep. 24, 2021

(87) PCT Pub. No.: WO2020/196432
PCT Pub. Date: Oct. 1, 2020

(65) Prior Publication Data
US 2022/0153991 A1 May 19, 2022

(30) Foreign Application Priority Data

Mar. 26, 2019 (JP) .............................. JP2019-058158

(51) Int. Cl.
*C08L 69/00* (2006.01)
*C08K 5/521* (2006.01)
*C08K 5/49* (2006.01)

(52) U.S. Cl.
CPC .......... *C08L 69/00* (2013.01); *C08L 2203/30* (2013.01); *C08L 2205/025* (2013.01); *C08L 2205/035* (2013.01)

(58) Field of Classification Search
CPC .................. C08L 69/00; C08L 2203/30; C08L 2205/025; C08L 2205/035; C08K 5/521; C08K 5/49
USPC ...................................................... 524/504
See application file for complete search history.

(56) References Cited

U.S. PATENT DOCUMENTS

2020/0048457 A1    2/2020    Ueda et al.

FOREIGN PATENT DOCUMENTS

| JP | 2001-49106 | | 2/2001 | |
|---|---|---|---|---|
| JP | 2003-138122 | | 5/2003 | |
| JP | 2003138122 | A * | 5/2003 | |
| JP | 2006-169461 | | 6/2006 | |
| JP | 2006169461 | A * | 6/2006 | |
| JP | 2006-193582 | | 7/2006 | |
| JP | 2006-257127 | | 9/2006 | |
| JP | 2011-195815 | | 10/2011 | |
| JP | 2011195815 | A * | 10/2011 | |
| JP | 2012-92324 | | 5/2012 | |
| JP | 2012-177088 | | 9/2012 | |
| JP | 2015-28135 | | 2/2015 | |
| JP | 2015-42752 | | 3/2015 | |
| WO | 2018/083975 | | 5/2018 | |
| WO | WO-2018083975 | A1 * | 5/2018 | ............... C08K 3/00 |

OTHER PUBLICATIONS

Japanese Written Exlplanation of Circumstances Concerning Accelerated Examination of counterpart Japanese Application No. 2020-520341 dated Dec. 9, 2020, with English Translation.
Japanese Notification of Reasons for Refusal of counterpart Japanese Application No. 2020-520341 dated Feb. 24, 2021, with English Translation.
The First Office Action dated Jan. 11, 2022, of counterpart Chinese Patent Application No. 202080024039.0, along with an English translation.

* cited by examiner

*Primary Examiner* — Ling Siu Choi
*Assistant Examiner* — Ronald Grinsted
(74) *Attorney, Agent, or Firm* — DLA Piper LLP (US)

(57) ABSTRACT

A thermoplastic resin composition includes: a polycarbonate resin (I); a specific graft copolymer (II); a vinyl copolymer (III); an inorganic filler (IV); and a phosphate ester compound (V). The vinyl-based copolymer (III) has a weight average molecular weight of 110,000 or less. A ratio of a melt flow rate of the vinyl-based copolymer (III) to a melt flow rate of the polycarbonate resin (I) is 7 or more and 12 or less. A blending amount of the phosphoric acid ester-based compound (V) is 1 to 10 parts by weight with respect to 100 parts by weight of a total amount of (I) to (IV).

4 Claims, 1 Drawing Sheet

A-A Cross Section

THERMOPLASTIC RESIN COMPOSITION AND MOLDED ARTICLE THEREOF

TECHNICAL FIELD

This disclosure relates to a thermoplastic resin composition that prevents appearance defects (silver appearance) due to silver streaks of a molded product and has excellent fluidity, and a molded product thereof.

BACKGROUND

Polycarbonate resins have excellent heat resistance and impact resistance and are thus widely used in a wide range of fields including the fields of automobiles, home appliances, OA equipment, and building materials. On the other hand, rubber-reinforced styrene resins typified by an ABS resin have excellent processability and mechanical properties and are thus used as molding materials for various components in a wide range of fields such as automobiles, home appliances, and OA equipment.

Compared to the rubber-reinforced styrene resins, the polycarbonate resins are inferior in molding processability during injection molding and secondary processability. Therefore, to make up for the shortcomings of the polycarbonate resins, it is common that the polycarbonate resin and the rubber-reinforced styrene resin are melt-mixed and alloyed. In particular, in the field of automobiles, in addition to heat resistance, impact resistance, and moldability, dimensional stability is also required, and to improve the dimensional stability, attempts have been made to add an inorganic filler such as talc.

However, rubber-reinforced styrene resins produced through emulsion polymerization, acid coagulation, and neutralization steps and silicate compound-based inorganic fillers such as talc may exhibit alkalinity, and when blended with a polycarbonate resin, there is a problem that defects in the appearance of the molded product such as silver streaks due to alkali decomposition of the resin occur.

As a related-art technique for blending the silicate compound-based inorganic fillers such as talc with a polycarbonate resin/rubber-reinforced styrene resin alloy, for example, JP 2003-138122 A discloses a resin composition containing an aromatic polycarbonate resin, a styrene-based resin, a phosphoric acid ester-based compound, and an inorganic filler in a specific composition.

In addition, JP 2015-28135 A discloses a resin composition containing an aromatic polycarbonate, an ABS resin, a phosphoric acid ester-based compound, a fluoropolymer, and talc in a specific composition.

Further, JP 2001-49106 A discloses a resin composition containing a resin composition containing an aromatic polycarbonate resin having a specific molecular weight, a styrene-based resin, a phosphoric acid ester-based compound, and talc in a specific composition.

Furthermore, WO 2018/083975 discloses a resin composition containing an aromatic polycarbonate resin, a styrene-based resin, a polyester resin, and talc in a specific composition.

JP 2012-177088 A discloses an ABS resin produced by emulsion polymerization.

However, the resin composition described in JP 2003-138122 A has a slightly reduced silver appearance, but the effect thereof is not sufficient and there is a problem in fluidity.

In addition, JP 2015-28135 A does not describe the reduction of the silver appearance due to the decomposition of the resin, and the effect is not sufficient.

JP 2001-49106 A also does not describe the reduction of the silver appearance due to the decomposition of the resin, and the effect is not sufficient.

The technique described in WO 2018/083975 is effective for crystalline resins in terms of reducing silver appearance defects caused by inorganic fillers, but does not provide sufficient effectiveness for silver appearance defects caused by rubber-reinforced styrene-based resins obtained by emulsion polymerization.

The technique described in JP 2012-177088 A also has an insufficient effect of reducing the silver appearance.

Therefore, it could be helpful to provide a thermoplastic resin composition that prevents the silver appearance of a molded product and has excellent fluidity and a molded product thereof.

SUMMARY

We found that when a polycarbonate resin, a graft copolymer, a vinyl-based copolymer, an inorganic filler, and a phosphoric acid ester-based compound are blended in a specific composition, and a melt viscosity ratio of the vinyl-based copolymer and the polycarbonate resin is controlled, it is possible to obtain a thermoplastic resin composition that can prevent the silver appearance of the molded product and has excellent fluidity.

We thus provide:

(1) A thermoplastic resin composition, containing: a polycarbonate resin (I); a graft copolymer (II); a vinyl-based copolymer (III); an inorganic filler (IV); and a phosphoric acid ester-based compound (V), in which:

the graft copolymer (II) is at least one of a graft copolymer (II-1) obtained by graft polymerization of a monomer mixture containing at least an aromatic vinyl-based monomer and a vinyl cyanide-based monomer in a presence of a diene-based rubbery polymer and a graft copolymer (II-2) obtained by graft polymerization of a monomer mixture containing at least an aromatic vinyl-based monomer and a vinyl cyanide-based monomer in a presence of an acrylic rubbery polymer obtained by polymerizing an acrylic acid ester-based monomer and a polyfunctional monomer;

the vinyl-based copolymer (III) has a weight average molecular weight of 110,000 or less;

a ratio (($III_{MF}$)/($I_{MF}$)) of a melt flow rate ($III_{MF}$) (g/10 min) (240° C., 10 kg) of the vinyl-based copolymer (III) to a melt flow rate ($I_{MF}$) (g/10 min) (temperature: 240° C., load: 10 kg) of the polycarbonate resin (I) is 7 or more and 12 or less; and a blending amount of the phosphoric acid ester-based compound (V) is 1 to 10 parts by weight with respect to 100 parts by weight of a total amount of (I) to (IV).

(2) The thermoplastic resin composition according to the above (1), in which the inorganic filler (IV) is at least one of talc and wollastonite.

(3) A molded product, which is obtained by molding the thermoplastic resin composition according to the above (1) or (2).

The silver appearance of the molded product can thus be prevented, and the yield rate can be improved.

In addition, since the thermoplastic resin has high fluidity, a large-sized molded product, a molded product having a complicated shape, and a thin molded product, which cannot be molded in the related art, can be obtained by injection molding. Therefore, it is possible not only to adapt to the increase in size and the complexity of the shape of the product, but also to reduce the cost of the product by reducing the thickness.

BRIEF DESCRIPTION OF THE DRAWINGS

FIG. 1A and FIG. 1B are explanatory views schematically showing a rectangular flat plate used in the Examples, in which FIG. 1A is a plan view, and FIG. 1B is a cross-sectional view taken along a line AA in FIG. 1A.

REFERENCE SIGNS LIST

P rectangular flat plate

DETAILED DESCRIPTION

Hereinafter, our thermoplastic resin compositions and molded products thereof will be specifically described.
Polycarbonate Resin (I)

The polycarbonate resin (I) is a resin having a repeating structural unit represented by general formula (1).

Wherein Z represents a substituted or unsubstituted alkylidene group having 2 to 5 carbon atoms, a cyclohexylidene group, an oxygen atom, a sulfur atom, or a sulfonyl group. $R_1$, $R_2$, $R_3$, and $R_4$ are each a hydrogen atom or an alkyl group having 1 to 6 carbon atoms, and may be the same or different from each other.

Z is preferably an isopropylidene group, and $R_1$ to $R_4$ are preferably hydrogen atoms.

The polycarbonate resin (I) is obtained by a reaction between an aromatic dihydroxy compound typically exemplified by 2,2-bis(4-hydroxyphenyl)propane and 2,2-bis(3,5-dimethyl-4-hydroxyphenyl)propane, and a carbonate precursor typically exemplified by phosgene.

In the thermoplastic resin composition, the content of the polycarbonate resin (I) is preferably 60 wt % to 90 wt %, more preferably 65 wt % to 85 wt %, and still more preferably 70 wt % to 80 wt %, when the total content of the polycarbonate resin (I), the graft copolymer (II), the vinyl-based copolymer (III), and the inorganic filler (IV) is 100 wt %. When the amount of the polycarbonate resin (I) added is less than 60 wt %, the fluidity is excellent, but the impact resistance and the heat resistance may decrease. On the other hand, when the amount of the polycarbonate resin (I) added is more than 90 wt %, the impact resistance and the heat resistance are excellent, but some products may not be molded due to insufficient fluidity during injection molding.

The viscosity average molecular weight ($M_V$) of the polycarbonate resin (I) is not particularly limited, and is preferably 10,000 or more and 21,000 or less, more preferably 12,000 or more and 20,000 or less, and most preferably 15,000 or more and 18,000 or less. When $M_V$ is 10,000 or more, mechanical properties such as impact resistance and heat resistance tend to improve, and when $M_V$ is 21,000 or less, the fluidity and the appearance of the molded product tend to improve, which are preferred.

The viscosity average molecular weight ($M_V$) of the polycarbonate resin (I) can be determined by the following method. First, the specific viscosity ($\eta_{SP}$) is calculated according to the following formula using a solution (concentration c=0.7) of 0.7 g of the polycarbonate resin (I) dissolved in 100 ml of methylene chloride at 20° C. with an Ostwald viscometer.

Specific viscosity($\eta_{SP}$)=$(t-t_0)/t_0$ $t_0$ is the number of seconds for methylene chloride to fall, and t is the number of seconds for the sample solution to fall.

Subsequently, the viscosity average molecular weight $M_V$ can be calculated from the obtained specific viscosity ($\eta_{SP}$) according to Schnell's formula.

$\eta_{SP}/c=[\eta]+0.45\times[\eta]^2 c$ where $[\eta]$ is the ultimate viscosity $[\eta]=1.23\times10^{-4}M_V^{0.83}$ The graft copolymer (II) constituting the thermoplastic resin composition is at least one of a graft copolymer (II-1) obtained by graft polymerization of a monomer mixture containing at least an aromatic vinyl-based monomer (B) and a vinyl cyanide-based monomer (C) in the presence of a diene-based rubbery polymer (A1) and a graft copolymer (II-2) obtained by graft polymerization of a monomer mixture containing at least the aromatic vinyl-based monomer (B) and the vinyl cyanide-based monomer (C) in the presence of an acrylic rubbery polymer obtained by polymerizing an acrylic acid ester-based monomer and a polyfunctional monomer (hereinafter, may be described as "acrylic rubbery polymer (A2)").
Graft Copolymer (II-1)

As the diene-based rubbery polymer (A1) that can be used for the graft copolymer (II-1), one having a glass transition temperature of 0° C. or lower is preferred, and the lower limit thereof is practically about −80° C. Examples of the diene-based rubbery polymer that can be used include polybutadiene, a styrene-butadiene copolymer, an acrylonitrile-butadiene copolymer, a styrene-butadiene block copolymer and a butyl acrylate-butadiene copolymer. Among these, polybutadiene is preferably used.

The weight average particle size of the diene-based rubbery polymer (A1) is not particularly limited, and is preferably 100 nm to 1200 nm, and more preferably 200 nm to 1200 nm. When one having a weight average particle size of less than 100 nm is used as the diene-based rubbery polymer (A1), the impact resistance may decrease. On the other hand, when one having a weight average particle size of more than 1200 nm is used, the fluidity may decrease.

From the viewpoint of achieving both the impact resistance and the fluidity, as the diene-based rubbery polymer (A1), it is preferable to use particles having a weight average particle size of 200 nm to 400 nm and particles having a weight average particle size of 450 nm to 1200 nm in combination, it is more preferable to use particles having a weight average particle size of 280 nm to 400 nm and particles having a weight average particle size of 600 nm to 1200 nm in combination, and it is still more preferable to use particles having a weight average particle size of 320 nm to 380 nm and particles having a weight average particle size of 700 nm to 1100 nm in combination.

When using two kinds of diene-based rubbery polymers (A1) having different particle sizes, from the viewpoint of the impact resistance and the fluidity, the weight ratio of low-particle size particles to high-particle size particles is preferably 90:10 to 50:50, more preferably 80:20 to 60:40, and still more preferably 75:25 to 65:35.

The weight average particle size of the diene-based rubbery polymer (A1) can be measured by the sodium alginate method (obtaining the particle size with a cumulative weight fraction of 50% from the concentration ratio of sodium alginate and the cumulative weight fraction of the sodium alginate concentration) described in "Rubber Age Vol. 88 p. 484-490 (1960) by E. Schmidt, P. H. Biddison".

The weight fraction of the diene-based rubbery polymer (A1) in the graft copolymer (II-1) is preferably 40 wt % to 65 wt %, more preferably 40 wt % to 60 wt %, and still more preferably 40 wt % to 50 wt %. When the weight fraction is 40 wt % or more, the impact resistance is improved, and when the weight fraction is 65 wt % or less, the fluidity is improved, which are preferred.

Examples of the aromatic vinyl-based monomer (B) contained in the monomer mixture include styrene, α-methylstyrene, vinyltoluene, o-ethylstyrene, p-methylstyrene, chlorostyrene and bromostyrene. In particular, styrene is preferably employed.

Examples of the vinyl cyanide-based monomer (C) contained in the monomer mixture include acrylonitrile, methacrylonitrile and ethacrylonitrile. In particular, acrylonitrile is preferably adopted.

In addition, the monomer mixture may contain another vinyl-based monomer copolymerizable with the aromatic vinyl-based monomer (B) and the vinyl cyanide-based monomer (C) to the extent that the desired effects are not lost. Specific examples of the another vinyl-based monomer include N-phenylmaleimide, N-methylmaleimide and methyl methacrylate. Another vinyl-based monomer can be selected according to each purpose, and these vinyl-based monomers can be used alone or in combination of two or more thereof. N-phenylmaleimide is preferred if there is an intention to further improve the heat resistance and the flame retardancy. Further, methyl methacrylate is preferably used if the improvement of hardness is emphasized.

The weight fraction of the aromatic vinyl-based monomer (B) in the graft copolymer (II-1) is preferably 26 wt % to 43 wt %, more preferably 30 wt % to 41 wt %, and particularly preferably 35 wt % to 41 wt %. When the weight fraction of the aromatic vinyl-based monomer (B) is 26 wt % or more, coloring tends to be difficult. On the other hand, when the weight fraction of the aromatic vinyl-based monomer (B) is 43 wt % or less, the graft polymerization tends to proceed easily, the graft ratio tends to improve, and the impact resistance tends to improve.

The weight fraction of the vinyl cyanide-based monomer (C) in the graft copolymer (II-1) is preferably 9 wt % to 17 wt %, more preferably 10 wt % to 16 wt %, and still more preferably 12 wt % to 16 wt %. When the weight fraction of the vinyl cyanide-based monomer (C) is 9 wt % or more, the graft polymerization tends to proceed easily, the graft ratio tends to improve, and the impact resistance tends to improve. When the weight fraction of the vinyl cyanide-based monomer (C) is 17 wt % or less, coloring is less likely to occur.

The graft ratio of the graft copolymer (II-1) is not particularly limited. From the viewpoint of the balance between the impact resistance and the fluidity, the graft ratio is preferably 7% to 30%, more preferably 20% to 28%, and still more preferably 22% to 26%. The graft ratio (%) is expressed by the equation below.

Graft ratio (%)=[amount of vinyl-based polymer polymerized with diene-based rubbery polymer by graft polymerization]/[rubber content of graft copolymer]×100.

As a polymerization method of the graft copolymer (II-1), any method such as an emulsion polymerization method, a suspension polymerization method, a continuous bulk polymerization method, and a solution continuous polymerization method can be used, and two or more of these may be combined. The emulsion polymerization method is most preferred because it is easy to control the temperature during polymerization.

Examples of the graft copolymer (II-1) include an acrylonitrile-butadiene-styrene graft copolymer (ABS resin), a methyl methacrylate-butadiene-styrene graft copolymer (MBS resin), and a methyl methacrylate-acrylonitrile-butadiene-styrene graft copolymer (MABS resin). Among these, the acrylonitrile-butadiene-styrene graft copolymer (ABS resin) is preferred.

Graft Copolymer (II-2)

The thermoplastic resin composition containing the graft copolymer (II-2) has excellent weather resistance.

Examples of an acrylic acid ester-based monomer (a), which constitutes the acrylic rubbery polymer (A2) obtained by copolymerizing the acrylic acid ester-based monomer (a) and a polyfunctional monomer (b) that can be used in the graft copolymer (II-2), include those having an alkyl group having 1 to 10 carbon atoms such as methyl acrylate, ethyl acrylate, n-butyl acrylate, t-butyl acrylate, and octyl acrylate. Two or more of these may be used. Among these, n-butyl acrylate is preferred.

The polyfunctional monomer (b) constituting the acrylic rubbery polymer (A2) is not particularly limited as long as it has two or more functional groups. Examples of the functional group include a group having a carbon-carbon double bond such as an allyl group and a (meth)acryloyl group. Examples of the polyfunctional monomer (b) include allyl compounds such as allyl acrylate, allyl methacrylate, diallyl maleate, triallyl cyanurate, and triallyl isocyanurate, divinylbenzenes, di(meth)acrylic acid ester-based compounds such as ethylene glycol dimethacrylate, diethylene glycol dimethacrylate, and propylene glycol dimethacrylate. Two or more of these may be used. Among these, allyl methacrylate is preferred because it is easy to adjust the gel swelling degree of the acrylic rubbery polymer (A2) to be described later in toluene and the graft ratio of the graft copolymer (II-2) within a desired range.

The acrylic rubbery polymer (A2) is preferably obtained by copolymerizing 97 wt % to 99.5 wt % of the acrylic acid ester-based monomer (a) and 3 wt % to 0.5 wt % of the polyfunctional monomer (b) with respect to a total of 100 wt % of the acrylic acid ester-based monomer (a) and the polyfunctional monomer (b). When the acrylic acid ester-based monomer (a) is 97 wt % or more and the polyfunctional monomer (b) is 3 wt % or less, the gel swelling degree of the acrylic rubbery polymer (A2) to be described later in toluene tends to increase, and the graft ratio of the graft copolymer (II-2) to be described later tends to decrease. As a result, the fluidity of the thermoplastic resin composition is improved and particles of the graft copolymer (II-2) can have an aggregated structure so that the impact strength and surface impact property of the molded product are improved.

It is more preferable that the acrylic acid ester-based monomer (a) is 98 wt % or more and the polyfunctional monomer (b) is 2 wt % or less, and it is still more preferable that the acrylic acid ester-based monomer (a) is more than 98.5 wt % and the polyfunctional monomer (b) is less than 1.5 wt %.

On the other hand, it is preferable that the acrylic acid ester-based monomer (a) is 99.5 wt % or less and the polyfunctional monomer (b) is 0.5 wt % or more, since the graft ratio of the graft copolymer (II-2) to be described later is improved and the impact strength and surface impact property of the molded product are improved.

The acrylic acid ester-based monomer (a) is more preferably 99.3 wt % or less, and still more preferably 99.0 wt % or less. In addition, the polyfunctional monomer (b) is more preferably 0.7 wt % or more, and still more preferably 1.0 wt % or more.

As a polymerization method of the acrylic rubbery polymer (A2), any method such as an emulsion polymerization method, a suspension polymerization method, a continuous bulk polymerization method, and a solution continuous polymerization method can be used, and two or more of these may be combined. Among these, an emulsion polymerization method or a bulk polymerization method is preferred. The emulsion polymerization method is most preferred since it is easy to adjust the volume average particle size to a desired range by removing heat during polymerization.

An emulsifier for use in the emulsion polymerization method is not particularly limited, and various surfactants can be used. As the surfactant, anionic surfactants such as a carboxylate salt type, a sulfate ester salt type, or a sulfonate salt type are preferably used. Two or more of these may be used.

Specific examples of the anionic surfactant include a caprilate salt, a capricate salt, a laurylate salt, a myristate salt, a palmitate salt, a stearate salt, an oleate salt, a linoleate salt, a linolenate salt, a rosinate salt, a behenate salt, a castor oil sulfate ester salt, a lauryl alcohol sulfate ester salt, a dodecylbenzene sulfonate salt, an alkylnaphthalene sulfonate salt, an alkyldiphenyl ether disulfonate salt, a naphthalene sulfonate condensate, a dialkyl sulfosuccinate salt, a polyoxyethylene lauryl sulfate salt, a polyoxyethylene alkyl ether sulfate salt, and a polyoxyethylene alkyl phenyl ether sulfate salt. Examples of the salt referred to here include an ammonium salt and alkali metal salts such as a sodium salt, a lithium salt and a potassium salt.

The initiator for use in the polymerization is not particularly limited, and cumene hydroperoxide is preferred as a peroxide, azobisisobutyronitrile as an azo compound, or potassium persulfate as a persulfate. Two or more of these initiators may be used.

The graft copolymer (II-2) is obtained by graft polymerization of a monomer mixture containing at least the aromatic vinyl-based monomer (B) and the vinyl cyanide-based monomer (C) in the presence of the acrylic rubbery polymer (A2). That is, the graft copolymer (II-2) is a copolymer obtained by graft polymerization of a monomer mixture containing the aromatic vinyl-based monomer and the vinyl cyanide-based monomer onto the acrylic rubbery polymer (A2).

The blending amount of the acrylic rubbery polymer (A2) is preferably 20 parts by weight or more, and more preferably 30 parts by weight or more, with respect to 100 parts by weight of a total of the acrylic rubbery polymer (A2) and the monomer mixture constituting the graft copolymer (II-2). On the other hand, the blending amount of the acrylic rubbery polymer (A2) is preferably 70 parts by weight or less, and more preferably 60 parts by weight or less. The blending amount of the monomer mixture is preferably 30 parts by weight or more, and more preferably 40 parts by weight or more. On the other hand, the blending amount of the monomer mixture is preferably 80 parts by weight or less, and more preferably 70 parts by weight or less.

The monomer mixture constituting the graft copolymer (II-2) contains the aromatic vinyl-based monomer (B) and the vinyl cyanide-based monomer (C), and may further contain a monomer copolymerizable with the above monomers, if necessary.

Examples of the aromatic vinyl-based monomer (B) include styrene, α-methylstyrene, p-methylstyrene, m-methylstyrene, o-methylstyrene, and t-butylstyrene. Two or more of these may be used. Among these, styrene is preferred.

Examples of the vinyl cyanide-based monomer (C) include acrylonitrile, methacrylonitrile, and ethacrylonitrile. Two or more of these may be used. Among these, acrylonitrile is preferred.

The other copolymerizable monomer is not particularly limited as long as it does not impair the desired effects. For example, as unsaturated carboxylic acid alkyl ester-based monomers, methyl (meth)acrylate is preferred; as unsaturated fatty acids, methacrylic acid is preferred; as acrylamide-based monomers, acrylamide or methacrylamide is preferred; and as maleimide-based monomers, N-phenylmaleimide is preferred. Two or more of these may be used.

As for the mixing ratio of the monomer mixture, it is preferable that the aromatic vinyl-based monomer (B) is 60 wt % to 80 wt %, the vinyl cyanide-based monomer (C) is 20 wt % to 40 wt %, and other copolymerizable monomers are 0 wt % to 20 wt % in 100 wt % of the total amount of the monomer mixture.

The graft ratio ($\beta$) of the graft copolymer (II-2) is preferably 5% to 40%. The graft ratio ($\beta$) is an index showing the compatibility of the graft copolymer (II-2). When the graft ratio is 5% or more, the compatibility of the graft copolymer (II-2) in the thermoplastic resin composition is improved, and the impact strength and surface impact property of the molded product can be further improved. The graft ratio is more preferably 8% or more. On the other hand, when the graft ratio is 40% or less, in the thermoplastic resin composition, the particles of the graft copolymer (II-2) are likely to aggregate with each other, and the impact strength and surface impact property of the molded product can be further improved. The graft ratio is more preferably 35% or less, still more preferably 30% or less.

The graft ratio ($\beta$) of the graft copolymer (II-2) can be determined by the following method. First, 100 ml of acetonitrile is added to a predetermined amount (m; about 1.5 g) of the graft copolymer (II-2) that had been dried in vacuum at 80° C. for 3 hours, and reflux is performed in a hot water bath at 70° C. for 3 hours. This solution is centrifuged at 9000 rpm for 40 minutes, then the insoluble matter is filtered, the insoluble matter is dried in vacuum at 80° C. for 5 hours, and the weight (n; unit: g) is measured. The graft ratio ($\beta$) is calculated according to the formula below. L is the rubber content (wt %) of the graft copolymer (that is, the content (wt %) of the acrylic rubbery polymer (A2) in the graft copolymer (II-2)).

$$\text{Graft ratio (\%)} = \{[(n)-((m) \times L/100)]/[(m) \times L/100]\} \times 100$$

The graft ratio of the graft copolymer (II-2) can be adjusted to a desired range by using, for example, the above-mentioned acrylic rubbery polymer (A2) and adjusting the amount of the chain transfer agent, emulsifier, initiator and the like for use in the polymerization.

As a polymerization method of the graft copolymer (II-2), any method such as an emulsion polymerization method, a suspension polymerization method, a continuous bulk polymerization method, and a solution continuous polymerization method can be used, and two or more of these may be combined. The emulsion polymerization method is most preferred because it is easy to control the temperature during polymerization.

Examples of the emulsifier for use in the emulsion polymerization method of the graft copolymer (II-2) include those exemplified as the emulsifier used in the emulsion polymerization method of the acrylic rubbery polymer (A2). In addition, examples of the polymerization initiator for use in the polymerization of the graft copolymer (II-2) include those exemplified as the initiator for use in the polymerization of the acrylic rubbery polymer (A2).

The chain transfer agent can also be used for the purpose of adjusting the polymerization degree and the graft ratio of the graft copolymer (II-2). Specific examples of the chain transfer agent include mercaptans such as n-octyl mercaptan, t-dodecyl mercaptan, n-dodecyl mercaptan, n-tetradecyl mercaptan, n-octadecyl mercaptan, and terpenes such as terpinolene. Two or more of these may be used. Among these, n-octyl mercaptan and t-dodecyl mercaptan are preferably used.

From the viewpoint of adjusting the graft ratio of the graft copolymer (II-2) to the above-mentioned preferred range, in the polymerization of the graft copolymer (II-2), it is preferable to use 0.05 to 0.5 parts by weight of the chain transfer agent, 0.5 to 5 parts by weight of the emulsifier, and 0.1 to 0.5 parts by weight of the initiator, with respect to a total of 100 parts by weight of the acrylic rubbery polymer (A2) and the monomer mixture.

Examples of the graft copolymer (II-2) include an acrylonitrile-acrylic rubbery polymer-styrene graft copolymer (ASA resin), a methyl methacrylate-acrylic rubbery polymer-styrene graft copolymer (MSA resin), and a methyl methacrylate-acrylonitrile-acrylic rubbery polymer-styrene graft copolymer (MASA resin). Among these, an acrylonitrile-acrylic rubbery polymer-styrene graft copolymer (ASA resin) is preferred.

The graft copolymer (II) often exhibits alkalinity depending on the production method adopted. Then, a more remarkable effect is brought about when the graft copolymer (II) exhibiting alkalinity is used.

For example, the graft copolymer (II) can be recovered by adding a coagulant to an aqueous dispersion (latex) of the graft copolymer (II) produced by emulsion polymerization. An acid or a water-soluble salt is used as the coagulant. Coagulation with an acid is preferred from the viewpoint of mold contamination. Specific examples of the coagulant include sulfuric acid, hydrochloric acid, phosphoric acid, and acetic acid, and two or more of these can be used. In coagulation with an acid, the acid adheres to the graft copolymer (II) and remains, and the acid may corrode metal equipment during the production process. To prevent this, a method of recovering the graft copolymer (II) after neutralizing the acid remaining in the graft copolymer (II) with an alkaline compound (neutralizing agent) is preferred. At this time, since the neutralizing agent adheres to the graft copolymer (II), the graft copolymer (II) is often alkaline. Sodium hydroxide is preferred as the neutralizing agent.

Whether the graft copolymer (II) is alkaline can be determined by the following method. First, the graft copolymer (II) is mixed with water to obtain a slurry having a solid content concentration of 10 wt %. Then, this slurry is placed in a water bath at 90° C. for 3 hours, and then the graft copolymer (II) is removed using a filter paper (Type 5A: JIS P 3801 (1995)). Then, the temperature of the obtained filtrate is lowered to 20° C., and the pH of the filtrate is measured with a pH meter. When the pH is more than 7, it is alkaline. When the pH is more than 7, the desired effect is likely to be obtained, and when the pH is 8 or more, a further effect can be obtained.

The content of the graft copolymer (II) is preferably 3 wt % to 15 wt %, more preferably 4 wt % to 12 wt %, and still more preferably 5 wt % to 9 wt %, when the total content of the polycarbonate resin (I), the graft copolymer (II), the vinyl-based copolymer (III), and the inorganic filler (IV) is 100 wt %. When the amount of the graft copolymer (II) added is 3 wt % or more, the impact resistance does not decrease, and when the amount is 15 wt % or less, the fluidity does not decrease, which are preferred.

Vinyl-Based Copolymer (III)

The vinyl-based copolymer (III) constituting the thermoplastic resin composition is preferably a vinyl-based copolymer obtained by copolymerizing at least an aromatic vinyl-based monomer (D) and a vinyl cyanide-based monomer (E).

During the copolymerization, it is preferable that the aromatic vinyl-based monomer (D) is 60 wt % to 85 wt %, and the vinyl cyanide-based monomer (E) is 15 wt % to 40 wt %; it is more preferable that the aromatic vinyl-based monomer (D) is 65 wt % to 80 wt %, and the vinyl cyanide-based monomer (E) is 20 wt % to 35 wt %; and it is still more preferable that the aromatic vinyl-based monomer (D) is 70 wt % to 80 wt %, and the vinyl cyanide-based monomer (E) is 20 wt % to 30 wt %.

When the aromatic vinyl-based monomer (D) is 60 wt % or more, the compatibility with the polycarbonate resin (I) is improved, and mechanical properties such as impact resistance are improved. In addition, when the aromatic vinyl-based monomer (D) is 85 wt % or less, the impact resistance tends to be improved by improving the compatibility with the graft copolymer (II), which is thus preferred.

The vinyl-based copolymer (III) does not contain the diene-based rubbery polymer (A1) and the acrylic rubbery polymer (A2). That is, the vinyl-based copolymer (III) is different from the graft copolymer (II-1) and the graft copolymer (II-2).

As in the aromatic vinyl-based monomer (B) in the graft copolymer (II) described above, examples of the aromatic vinyl-based monomer (D), which is a component of the vinyl-based copolymer (III), include styrene, α-methylstyrene, vinyltoluene, o-ethylstyrene, p-methylstyrene, m-methylstyrene, t-butylstyrene, vinyltoluene, chlorostyrene, and bromostyrene. It is not necessary to use one of these alone, and a plurality of kinds may be used in combination. Among these, styrene is preferably used.

As in the vinyl cyanide-based monomer (C) in the graft copolymer (II) described above, examples of the vinyl cyanide-based monomer (E), which is a component of the vinyl-based copolymer (III), include acrylonitrile, methacrylonitrile and ethacrylonitrile. In particular, acrylonitrile is preferably adopted. It is not necessary to use one of these alone, and a plurality of kinds may be used in combination.

In addition, as in the graft copolymer (II), the vinyl-based copolymer (III) may also contain another vinyl-based monomer copolymerizable with the aromatic vinyl-based monomer (D) and the vinyl cyanide-based monomer (E) to the extent that the desired effects are not lost. Specific examples of the another vinyl-based monomer include N-phenylmaleimide, N-methylmaleimide and methyl methacrylate. Another vinyl-based monomer can be selected according to each purpose, and these vinyl-based monomers can be used alone or in combination of two or more thereof. N-phenylmaleimide is preferred if there is an intention to further improve the heat resistance and the flame retardancy. Further, methyl methacrylate is preferably used if the improvement of hardness is emphasized.

The vinyl-based copolymer (III) constituting the thermoplastic resin composition has a weight average molecular weight of 110,000 or less, more preferably 105,000 or less, and still more preferably 100,000 or less. In particular, the lower limit of the weight average molecular weight is not limited, and 90,000 or more is preferred from the viewpoint of impact resistance.

Examples of the vinyl-based copolymer (III) include an acrylonitrile-styrene copolymer (AS resin), and a methyl methacrylate-styrene copolymer (MS resin). Among these, the acrylonitrile-styrene copolymer (AS resin) is preferred.

The content of the vinyl-based copolymer (III) is preferably 4 wt % to 12 wt %, more preferably 4 wt % to 10 wt %, and still more preferably 4 wt % to 8 wt %, when the total content of the polycarbonate resin (I), the graft copolymer (II), the vinyl-based copolymer (III), and the inorganic filler (IV) is 100 wt %. When the amount of the vinyl-based copolymer (III) added is 4 wt % or more, the silver appearance of the molded product is less likely to occur, and when the amount is 12 wt % or less, the impact resistance does not decrease, which are preferred.

The MFR ratio ((III)/(I)) of the vinyl-based copolymer (III) to the polycarbonate resin (I) at 240° C. and 10 kg is 7 or more and 12 or less. The MFR ratio is more preferably 7 or more and 11 or less, and still more preferably 8 or more and 11 or less. When the MFR ratio is 7 or more, the silver appearance does not deteriorate, and when the MFR ratio is 12 or less, the fluidity does not decrease, which are preferred.

The silver appearance refers to appearance defects due to silver streaks, and means a silver stripe pattern. Typically, it refers to appearance defects with streaks on the surface of the molded product caused by elongation of the gas generated in the resin composition due to the alkali decomposition of the polycarbonate resin, elongation being caused by shearing generated at the interface between the molten resin composition and the mold, when a mold is filled with the weighed resin composition in a cylinder of an injection molding machine.

In the resin composition in which the polycarbonate resin (I) and the graft copolymer (II) are blended, the graft copolymer (II) may be alkaline, and when such a graft copolymer (II) comes into contact with the polycarbonate resin, alkali decomposition of the polycarbonate resin occurs, and air bubbles (gas) are generated by the decomposition, causing defects in the appearance of the molded product such as silver streaks. Alkali decomposition means that alkali such as a hydroxide ion acts as a catalyst on the carbonate bond portion to promote hydrolysis and generate gas such as carbon dioxide and low molecular weight components.

In a resin composition containing two or more kinds of resins, the resins tend to be compatible when the ratio of the melt viscosities of the resins is small. In other words, when the ratio of the melt viscosities of the resins is large, the phase separation tends to occur.

Therefore, the difference in melt viscosity at 240° C. between the vinyl-based copolymer (III) and the polycarbonate resin (I) is made to be within a specific range so that the phase separation of the vinyl-based copolymer (III) from the polycarbonate resin (I) is promoted.

When the vinyl-based copolymer (III) phase is separated from the polycarbonate resin (I) phase, the vinyl-based copolymer (III) is considered to be unevenly distributed around the graft copolymer (II) having a more similar chemical structure. It is presumed that the probability of contact between the alkaline graft copolymer (II) and the polycarbonate resin (I) is reduced, which prevents the decomposition of the polycarbonate resin and prevents the silver appearance.

The method of producing the vinyl-based copolymer (III) is not particularly limited, and bulk polymerization, suspension polymerization, bulk suspension polymerization, solution polymerization, emulsion polymerization, precipitation polymerization and a combination thereof are used. There is no particular limitation on the method of charging the monomer, and the monomer may be added all at once at the initial stage, or the method of addition may be divided into several times to give or prevent the composition distribution of the copolymer.

As the initiator for use in the polymerization of the vinyl-based copolymer (III), the initiator mentioned in the graft copolymer (II-1) is preferably used.

During the polymerization, it is also possible to use a chain transfer agent such as mercaptan or terpene for the purpose of adjusting the polymerization degree of the graft copolymer (II-1) and the vinyl-based copolymer (III). Specific examples of the chain transfer agent include n-octyl mercaptan, t-dodecyl mercaptan, n-dodecyl mercaptan, n-tetradecyl mercaptan, n-octadecyl mercaptan and terpinolene. Among these, n-octyl mercaptan, t-dodecyl mercaptan and n-dodecyl mercaptan are preferably used. When these chain transfer agents are used, they are used alone or in combination of two or more thereof.

Inorganic Filler (IV)

The shape of the inorganic filler (IV) constituting the thermoplastic resin composition may be any shape such as plate-like, fibrous, powdery, and granular. Specific examples thereof include: plate-like fillers such as glass flakes, mica, talc, alumina flakes, kaolin, carbon flakes, metal flakes, scaly carbon, graphite, clay; fibrous fillers and whisker-like fillers such as glass fibers, PAN-based and pitch-based carbon fibers, metallic fibers such as stainless steel fibers, aluminum fibers and brass fibers, organic fibers such as aromatic polyamide fibers, gypsum fibers, ceramic fibers, asbestos fibers, zirconia fibers, alumina fibers, silica fibers, titanium oxide fibers, silicon carbide fibers, glass fibers, rock wool, potassium titanate whiskers, barium titanate whiskers, aluminum borate whiskers, and silicon nitride whiskers; and powdery fillers and granular fillers such as silica, calcium carbonate, glass beads, glass microballoon, molybdenum disulfide, wollastonite, montmorillonite, titanium oxide, zinc oxide, barium sulfate, calcium polyphosphate, and graphite.

In particular, the kind of the glass fiber is not particularly limited as long as it is generally used for reinforcing the resin and, for example, it can be selected from a long fiber-type and a short fiber-type chopped strand, a milled fiber and the like. The surface of the inorganic filler may be treated with a known coupling agent (for example, a silane-based coupling agent or a titanate-based coupling agent) or another surface treatment agent before use.

In addition, the glass fiber may be coated or bundled with a thermoplastic resin such as an ethylene-vinyl acetate copolymer or a thermosetting resin such as an epoxy resin.

The inorganic filler may be coated or bundled with a thermoplastic resin such as an ethylene-vinyl acetate copolymer or a thermosetting resin such as an epoxy resin, or may be treated with a coupling agent such as aminosilane or epoxysilane.

These fillers can also be used in combination of two or more thereof.

Further, mica, talc, kaolin, calcium carbonate and wollastonite are preferred. Among these, in particular, talc and wollastonite are preferred in terms of dimensional stability and surface appearance.

When the inorganic filler (IV) is talc, to obtain high-grade balance between mechanical properties, dimensional stability, retention stability and the appearance of the molded product, the average particle size of talc is preferably 1.0 µm to 30.0 µm, more preferably 2.0 µm to 20.0 µm, and still more preferably 3.0 µm to 10.0 µm. When the average particle size is 1.0 µm or more, the retention stability tends to be improved and the appearance of the molded product tends to be improved, and when the average particle size is 30.0 µm or less, the mechanical properties and the dimensional stability tend to be improved, which are preferred.

When the inorganic filler (IV) is wollastonite, the fiber length is preferably 5.0 µm to 300.0 µm, more preferably 6.0 µm to 250.0 µm, and still more preferably 7.0 µm to 200.0 µm. In addition, the average fiber diameter is preferably 1.0 µm to 10.0 µm, more preferably 2.0 µm to 9.0 µm, and still more preferably 3.0 µm to 8.0 µm.

The aspect ratio is preferably 3 to 30, more preferably 3 to 20, and still more preferably 3 to 15. When the aspect ratio is 3 or more, the reinforcing effect is sufficient, and when the aspect ratio is 30 or less, the appearance of the molded product is not roughened, which are preferred.

The content of the inorganic filler (IV) is preferably 10 wt % to 20 wt %, more preferably 11 wt % to 19 wt %, and still more preferably 12 wt % to 18 wt %, when the total content of the polycarbonate resin (I), the graft copolymer (II), the vinyl-based copolymer (III), and the inorganic filler (IV) is 100 wt %. When the amount of the inorganic filler (IV) added is 10 wt % or more, the mechanical properties and the dimensional stability do not decrease, and when the amount is 20 wt % or less, the retention stability does not decrease and the silver appearance of the molded product does not deteriorate, which are preferred.

Phosphoric Acid Ester-Based Compound (V)

As the phosphoric acid ester-based compound (V) constituting the thermoplastic resin composition, for example, a compound represented by general formula (2) can be used.

(2)

In general formula (2), $R_1$, $R_2$, $R_3$ and $R_4$ each independently represent a hydrogen atom or a monovalent organic group, and at least one of $R_1$, $R_2$, $R_3$ and $R_4$ is a monovalent organic group. X is a divalent organic group, k, l, m and n are each independently 0 or 1, and N is an integer of 0 to 10.

In general formula (2), examples of the monovalent organic group include an alkyl group, an aryl group, and a cycloalkyl group which may be substituted. Examples of the substituent when substituted include an alkyl group, an alkoxy group, an alkylthio group, an aryl group, an aryloxy group, and an arylthio group. Further, a group in which these substituents are combined (arylalkoxyalkyl group or the like), or a group in which these substituents are bonded and combined with an oxygen, sulfur, nitrogen atom or the like (arylsulfonylaryl groups or the like) may be a substituent. In particular, the monovalent organic group is preferably a 2,6-dimethylphenyl group.

In addition, examples of the divalent organic group include a group derived from an alkylene group, a phenylene group which may have a substituent, polyhydric phenols, and polynuclear phenols (bisphenols or the like). In particular, the divalent organic group is preferably resorcinol.

Suitable specific examples of the phosphoric acid ester-based compound (V) include trimethyl phosphate, triethyl phosphate, tripropyl phosphate, tributyl phosphate, tripentyl phosphate, trihexyl phosphate, tricyclohexyl phosphate, trioctyl phosphate, triphenyl phosphate, tricresyl phosphate, trixylenyl phosphate, hydroxyphenyldiphenyl phosphate, cresyldiphenyl phosphate, xylenyldiphenyl phosphate, and compounds represented by chemical formula (3), chemical formula (4) or chemical formula (5).

(3)

(4)

(5)

The content of the phosphoric acid ester-based compound (V) is 1 to 10 parts by weight with respect to 100 parts by weight in a total amount of (I) to (IV). When the content of the phosphoric acid ester-based compound (V) is 1 part by weight or more, the silver appearance tends to be reduced, and when the content is 10 parts by weight or less, the heat resistance and the impact resistance tend to be improved. The content of the phosphoric acid ester-based compound (V) is preferably 2 parts by weight or more, and more preferably 3 parts by weight or more. In addition, the content of the phosphoric acid ester-based compound (V) is preferably 8 parts by weight or less, and more preferably 6 parts by weight or less.

Further, a known impact resistance improving material can be used as long as the desired properties are not impaired. However, since the heat resistance is lowered, it is preferable not to use a polyester resin such as polybutylene terephthalate or polyethylene terephthalate, or a crystalline resin such as nylon resin.

Further, a known matte improving material can be used as long as the desired properties are not impaired.

If necessary, hindered phenolic-based antioxidants, sulfur-containing compound-based antioxidants, phosphorus-containing organic compound-based antioxidants, phenol-based and acrylate-based thermal antioxidants, benzotriazole-based, benzophenone-based and salicylate-based UV absorbers, molding processing aids such as acrylic acid other than the graft copolymer (II-2) and esters thereof, a polymer or copolymer composed of methacrylic acid and esters thereof and modified polytetrafluoroethylene, flame retardants, flame retardant aids, antibacterial agents such as silver antibacterial agents, antifungal agents, carbon black, titanium oxide, mold release agents, lubricants, pigments and dyes can be added as long as the desired properties are not impaired.

The thermoplastic resin composition can be obtained by melting and mixing the respective constituent resin components. The melt-mixing method is not particularly limited, and a method of melt-mixing using a single screw or biaxial screw in a cylinder including a heating device and a vent can be adopted. The heating temperature during melt mixing is usually 230° C. to 320° C., and the temperature gradient during melt mixing can be freely set within a range that does not impair the desired object. When a biaxial screw is used, screws may rotate in the same direction or in different directions. Further, either an intermeshing screw or a non-intermeshing screw may be used.

The method of molding the thermoplastic resin composition is not particularly limited, and it is preferably molded by injection molding. The injection molding can be carried out, preferably at a temperature of 240° C. to 300° C., usually in the temperature range for molding the thermoplastic resin composition. The mold temperature during the injection molding is preferably 30° C. to 80° C., which is usually used for molding.

The thermoplastic resin composition prevents the silver appearance of the molded product and has excellent fluidity. In addition to the above, the thermoplastic resin composition containing the graft copolymer (II-2) also has excellent weather resistance. Therefore, the thermoplastic resin composition is suitably applied to a molded product having a large size or a complicated shape.

That is, the thermoplastic resin composition can be suitable for use in power window panels, center consoles, center clusters, console shutters, lever controllers, console boxes, and the like for automobile interiors, and can also be applied to exterior materials for automobiles, that is, rear spoilers, grilles, garnishes, door mirrors, roofs, fenders, bumpers, and the like. Further, the thermoplastic resin composition can be suitably used for electrical and electronic applications, OA equipment applications, and housing/building material applications.

EXAMPLES

To explain our compositions and molded articles more specifically, Examples are given below, but these Examples do not limit this disclosure in any way and can be modified in various ways. First, the evaluation methods in each Reference Example, Example and Comparative Example are described below.

(1) Graft Ratio

The graft copolymers (II-1) and (II-2) obtained as described below were weighed in a predetermined amount (m; about 1 g), 200 ml of acetone was added thereto, and reflux was performed in a hot water bath at a temperature of 70° C. for 3 hours. This solution was centrifuged at 8800 rpm (10000 G) for 40 minutes and then the insoluble material was filtered. The obtained acetone-insoluble matter was dried under reduced pressure at 60° C. for 5 hours, and the mass (n; unit: g) was measured. The graft ratio was calculated according to the formula below. L is the rubber content of the graft copolymer (a real number more than 0 and less than 1).

Graft ratio(mass %)={[(n)−{(m)×L}]/[(m)×L]}×100.

(2) Weight Average Molecular Weight

About 0.03 g of each of vinyl-based copolymers (III-1) to (III-5) obtained as described below was weighed and dissolved in about 15 g of tetrahydrofuran to obtain a solution of about 0.2 mass %. The weight average molecular weight was determined by converting polystyrene as a standard substance from a GPC chromatogram using the solution. GPC measurement was performed under the following conditions.

Equipment: Waters 2695
Column temperature: 40° C.
Detector: RI2414 (Differential Refractometer)
Carrier eluent flow rate: 0.3 ml/min (solvent: tetrahydrofuran)
Column: TSKgel Super HZM-M (6.0 mm I.D.×15 cm) and TSKgel Super HZM-N (6.0 mm I.D.×15 cm) in series (both manufactured by Tosoh Corporation).
Standard sample: monodispersed polystyrene manufactured by Tosoh Corporation.

(3) Evaluation of Silver Appearance

Figure 1A:
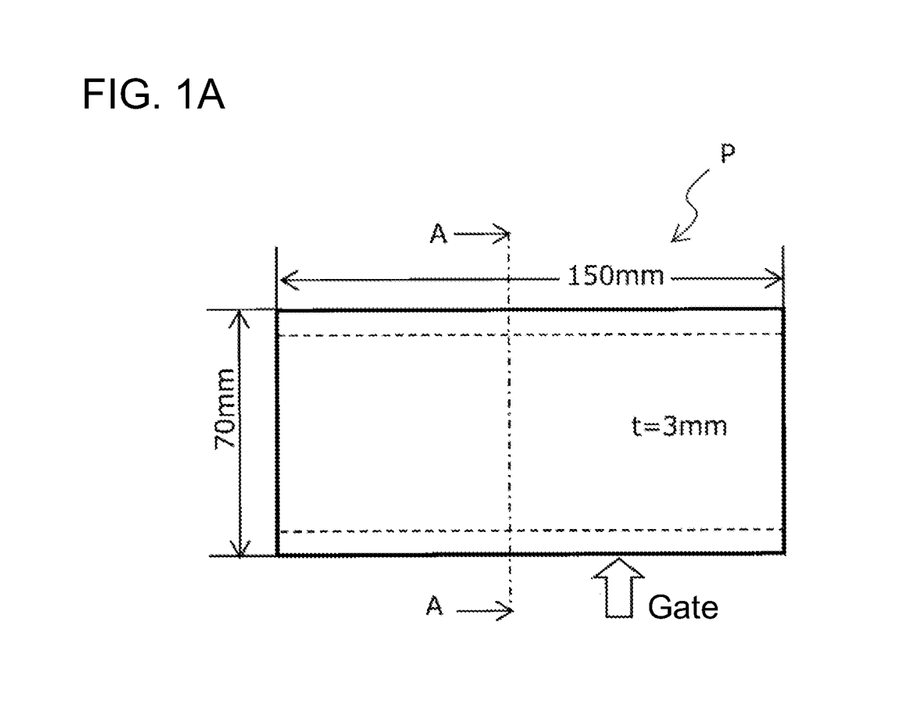
Figure 1B:
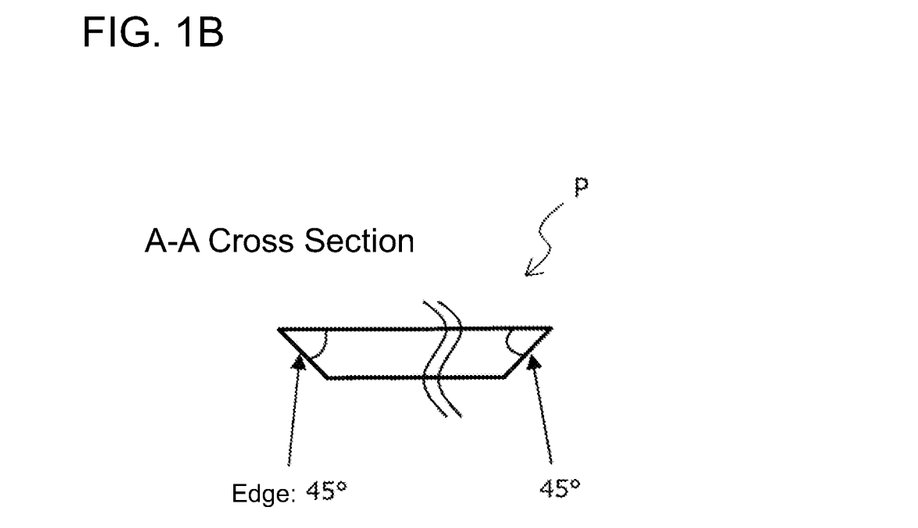

The cylinder temperature was set to 290° C., the mold temperature was set to 10° C., and a rectangular flat plate P having a width of 70 mm, a length of 150 mm, and a thickness of 3 mm and having an edge with an angle of 45° in the longitudinal direction, schematically shown in FIG. 1A and FIG. 1B, was formed using an injection molding machine (FIG. 1A is a plan view of the rectangular flat plate P, FIG. 1B is a cross-sectional view of the rectangular flat plate P taken along the line AA, and the position of the injection molding gate is indicated by a white arrow). The smaller the occurrence of silver streaks, the better the silver appearance of the obtained molded product, and the visual confirmation was made according to the following criteria. 3 to 5 were considered as pass levels, and 1 and 2 were considered as fail levels.

5: No silver streaks.
4: The number of silver streaks generated is less than 10, which is not problematic.
3: The number of silver streaks generated is 10 or more and less than 30, which is not problematic.
2: The occurrence of silver streaks is conspicuous near the gate, which is a problem in appearance.
1: There are silver streaks on the entire molded product, which is a problem in appearance.

(4) Fluidity and Melt Flow Rate

The melt flow rate of each of the polycarbonate-based resin (I), the vinyl-based copolymer (III) obtained below, and pellets obtained by each Example and Comparative Example was measured under conditions of a temperature of 240° C. and a load of 10 kg according to ISO1133 (2011 version).

(5) Impact Resistance

From the pellet obtained in each Example and Comparative Example, a multipurpose test piece type A1 specified in JIS K7139 (2009) was molded using an injection molding machine with a cylinder temperature of 250° C. and a mold temperature of 60° C., and the Charpy impact strength was measured according to ISO179/1eA (2009) using a type B2 test piece cut from the above test piece.

(6) Heat Resistance

The thermal deformation temperature was measured according to ISO75-2 (measured under a condition of 1.8 MPa). The test piece was obtained by molding a multipurpose test piece type A1 specified in JIS K 7139 (2009) using an injection molding machine with a cylinder temperature of 250° C. and a mold temperature of 60° C.

Polycarbonate-Based Resin (I)

Polycarbonate-based resin (I-1): product name "IUPILON" (registered trademark) H-4000, viscosity average molecular weight: 15,000, manufactured by Mitsubishi Engineering-Plastics Corporation Polycarbonate-based resin (I-2): product name "IUPILON" (registered trademark) H-3000, viscosity average molecular weight: 18,000, manufactured by Mitsubishi Engineering-Plastics Corporation Polycarbonate-based resin (I-3): product name "IUPILON" (registered trademark) S-3000, viscosity average molecular weight: 21,500, manufactured by Mitsubishi Engineering-Plastics Corporation Preparation of Graft Copolymer (II-1)

In the presence of 45 wt % (in terms of solid content) of a polybutadiene latex (diene-based rubbery polymer (A1) obtained by using two polymers having weight average particle sizes of 350 nm and 800 nm in combination in a mass ratio of 8:2), a monomer mixture containing 40 wt % of styrene and 15 wt % of acrylonitrile was polymerized by emulsion polymerization using potassium stearate, thereby obtaining a rubber-reinforced styrene-acrylonitrile copolymer latex. This latex was added to an aqueous solution of dilute sulfuric acid for aggregation, then neutralized with an aqueous solution of sodium hydroxide, and then subjected to washing, dehydration and drying steps to prepare a graft copolymer (II-1). The graft ratio was 25%. The graft copolymer (II-1) was alkaline (pH: 8).

Preparation of Graft Copolymer (II-2)

Step of Obtaining Acrylic Rubbery Polymer (A2)

Into a reaction vessel, 130 parts by weight of pure water and 1 part by weight of an aqueous solution of disproportionated potassium rosinate (in terms of solid content) as an emulsifier were charged. Then, the temperature was raised to 75° C., and a mixture (mixture 1) of 19.8 parts by weight of n-butyl acrylate and 0.2 parts by weight of allyl methacrylate was continuously added thereto over 1 hour with stirring (first addition step). Next, 8 parts by weight of a 2 wt % aqueous solution of potassium persulfate and 1.5 parts by weight of an aqueous solution of disproportionated potassium rosinate (in terms of solid content) were continuously added over 6 hours (second addition step). In addition, 2 hours after the start of addition of the aqueous solution of potassium persulfate and the aqueous solution of disproportionated potassium rosinate, a mixture (mixture 3) of 79.2 parts by weight of n-butyl acrylate and 0.8 parts by weight of allyl methacrylate was added over 4 hours (third addition step). An acrylic rubbery polymer (A2) latex was obtained by emulsion polymerization by holding for another 1 hour after the addition was completed.

Step of Obtaining Graft Copolymer

Then, a mixture of 13.2 parts by weight of pure water, 0.48 parts by weight of anhydrous glucose, 0.26 parts by weight of sodium pyrophosphate and 0.01 parts by weight of ferrous sulfate, a mixture of 0.4 parts by weight of potassium oleate and 12.5 parts by weight of pure water, 50 parts by weight of the acrylic rubbery polymer (A2) latex (in terms of solid content) and 94.3 parts by weight of pure water were charged into a reaction vessel, the temperature was raised to 58° C., and a mixture (i) of 36.5 parts by weight of styrene, 13.5 parts by weight of acrylonitrile and 0.2 parts by weight of t-dodecyl mercaptan was continuously added over 4 hours with stirring. Half an hour after the start of continuous addition, the temperature inside the vessel was raised to 62° C., and a mixture of 0.3 parts by weight of cumene hydroperoxide, 2.0 parts by weight of potassium oleate and 12.5 parts by weight of pure water was continuously added in parallel over 5 hours. Subsequently, at the end of the addition of the mixture (i), the temperature was further raised to 65° C. to obtain a graft copolymer latex at a polymerization rate of 98%. This graft copolymer latex was added to an aqueous solution of dilute sulfuric acid for aggregation, then neutralized with an aqueous solution of sodium hydroxide, and then subjected to washing, dehydration and drying steps to obtain a powdery graft copolymer (II-2). The graft ratio was 30%. The graft copolymer (II-2) was alkaline (pH: 8).

Preparation of Vinyl-Based Copolymer (III)

A slurry obtained by suspension polymerization of a monomer mixture containing 76 wt % of styrene and 24 wt % of acrylonitrile was subjected to washing, dehydration and drying steps to obtain a vinyl-based copolymer (III-1) having a weight average molecular weight of 90,000.

A slurry obtained by suspension polymerization of a monomer mixture containing 76 wt % of styrene and 24 wt % of acrylonitrile was subjected to washing, dehydration and drying steps to obtain a vinyl-based copolymer (III-2) having a weight average molecular weight of 95,000.

A slurry obtained by suspension polymerization of a monomer mixture containing 76 wt % of styrene and 24 wt % of acrylonitrile was subjected to washing, dehydration and drying steps to obtain a vinyl-based copolymer (III-3) having a weight average molecular weight of 99,000.

A slurry obtained by suspension polymerization of a monomer mixture containing 76 wt % of styrene and 24 wt % of acrylonitrile was subjected to washing, dehydration and drying steps to obtain a vinyl-based copolymer (III-4) having a weight average molecular weight of 108,000.

A slurry obtained by suspension polymerization of a monomer mixture containing 76 wt % of styrene and 24 wt % of acrylonitrile was subjected to washing, dehydration and drying steps to obtain a vinyl-based copolymer (III-5) having a weight average molecular weight of 115,000.

Inorganic Filler (IV)

Talc (IV-1): product name "Micron White #5000S", average particle size: 4.8 μm, manufactured by Hayashi Kasei Co., Ltd.

Wollastonite (IV-2): product name "NYGLOS 4W 10992", average fiber diameter: 7 μm, average fiber length: 63 μm, manufactured by Imerys Specialities Japan Co., Ltd.

Phosphoric Acid Ester-Based Compound (V)

Aromatic condensed phosphoric acid ester; product name "PX-200" manufactured by DAIHACHI CHEMICAL INDUSTRY CO., LTD.

Examples 1 to 14 and Comparative Examples 1 to 6

The polycarbonate-based resin (I), the graft copolymer (II), the vinyl-based copolymer (III), the inorganic filler (IV), and the phosphoric acid ester-based compound (V) were blended as shown in the tables, and a twin-screw extruder (temperature range: 240° C. to 260° C.) having a screw diameter of 30 mm and rotating in the same direction was used for melt-kneading to obtain pellets. The obtained pellets were evaluated as described above. Further, from the obtained pellets, a test piece was prepared using an injection molding machine (molding temperature: 250° C., mold temperature: 60° C.) and evaluated by the above-mentioned method. The molded product for confirming the surface appearance of the above (3) was produced under the conditions described in the above (3). The evaluation results are shown in the tables.

The thermoplastic resin compositions of Examples 1 to 14 prevent the silver appearance of the molded product and have excellent fluidity. On the other hand, it is seen from a comparison of Examples 1 to 4 to Comparative Examples 1 to 3 that when the ratio of the melt flow rate of the vinyl-based copolymer (III) to that of the polycarbonate-based resin (I) is smaller than our range, the appearance deteriorates, and when the ratio is larger than our range, the fluidity deteriorates. In addition, it is seen from a comparison of Examples 5, 6, 7 to Comparative Example 4 that when the molecular weight of the vinyl-based copolymer (III) is larger than our range, the fluidity deteriorates. It is seen from a comparison of Examples 8 to 10 to Comparative Examples 5, 6 that when the amount of the phosphoric acid ester compound (V) added is smaller than our range, the appearance is deteriorated, and when the amount is larger than our range, the impact strength decreases.

TABLE 1

|  |  | Example 1 | Example 2 | Example 3 | Example 4 | Example 5 | Example 6 | Example 7 |
|---|---|---|---|---|---|---|---|---|
| Polycarbonate resin (I) | I-1 (part by weight) | 7 |  |  |  |  |  |  |
|  | I-2 (part by weight) | 68 | 75 | 56 | 37.5 | 75 | 75 | 56 |
|  | I-3 (part by weight) |  |  | 19 | 37.5 |  |  | 19 |
| Graft copolymer (II) | II-1 (part by weight) | 7 | 7 | 7 | 7 | 7 | 7 | 7 |
|  | II-2 (part by weight) |  |  |  |  |  |  |  |
| Vinyl-based copolymer (III) | III-1 (part by weight) |  |  |  |  | 6 |  |  |
|  | III-2 (part by weight) |  |  |  |  |  | 6 |  |
|  | III-3 (part by weight) | 6 | 6 | 6 | 6 |  |  |  |
|  | III-4 (part by weight) |  |  |  |  |  |  | 6 |
|  | III-5 (part by weight) |  |  |  |  |  |  |  |
| Inorganic filler (IV) | IV-1 (part by weight) | 12 | 12 | 12 | 12 | 12 | 12 | 12 |
|  | IV-2 (part by weight) |  |  |  |  |  |  |  |
| Phosphoric acid ester-based compound (V) | V (part by weight) | 4 | 4 | 4 | 4 | 4 | 4 | 4 |
| Weight average molecular weight of vinyl-based copolymer (III) | — |  | 99,000 | 99,000 | 99,000 | 99,000 | 90,000 | 95,000 | 108,000 |
| Melt flow rate of vinyl-based copolymer (III) | g/10 min | 274 | 274 | 274 | 274 | 297 | 280 | 234 |
| Melt flow rate of polycarbonate resin (I) | g/10 min | 35 | 32 | 28 | 24 | 32 | 32 | 28 |
| Melt flow rate ratio [(III)/(I)] of vinyl-based copolymer (III) to polycarbonate resin (I) | — |  | 8 | 9 | 10 | 11 | 9 | 9 | 8 |
| Silver appearance of molded product | — |  | 3 | 4 | 5 | 5 | 5 | 5 | 5 |
| Pellet melt flow rate (fluidity) | g/10 min | 59 | 53 | 42 | 36 | 60 | 56 | 39 |
| Charpy impact strength of molded product | kJ/m$^2$ | 5 | 6 | 7 | 8 | 3 | 4 | 7 |
| Deflection temperature under load of molded product | ° C. | 112 | 112 | 112 | 112 | 112 | 112 | 112 |

TABLE 2

|  |  | Example 8 | Example 9 | Example 10 | Example 11 | Example 12 | Example 13 | Example 14 |
|---|---|---|---|---|---|---|---|---|
| Polycarbonate resin (I) | I-1 (part by weight) |  |  |  |  |  |  |  |
|  | I-2 (part by weight) | 75 | 75 | 75 | 75 | 75 | 75 | 75 |
|  | I-3 (part by weight) |  |  |  |  |  |  |  |
| Graft copolymer (II) | II-1 (part by weight) | 7 | 7 | 7 |  | 3 | 7 | 7 |
|  | II-2 (part by weight) |  |  |  | 7 | 4 |  |  |
| Vinyl-based copolymer (III) | III-1 (part by weight) |  |  |  |  |  |  |  |
|  | III-2 (part by weight) |  |  |  |  |  |  |  |
|  | III-3 (part by weight) | 6 | 6 | 6 | 6 | 6 | 6 | 6 |
|  | III-4 (part by weight) |  |  |  |  |  |  |  |
|  | III-5 (part by weight) |  |  |  |  |  |  |  |

TABLE 2-continued

|  |  | Example 8 | Example 9 | Example 10 | Example 11 | Example 12 | Example 13 | Example 14 |
|---|---|---|---|---|---|---|---|---|
| Inorganic filler (IV) | IV-1 (part by weight) | 12 | 12 | 12 | 12 | 12 | 6 | |
|  | IV-2 (part by weight) |  |  |  |  |  | 6 | 12 |
| Phosphoric acid ester-based compound (V) | V (part by weight) | 1 | 8 | 10 | 4 | 4 | 4 | 4 |
| Weight average molecular weight of vinyl-based copolymer (III) | — | 99,000 | 99,000 | 99,000 | 99,000 | 99,000 | 99,000 | 99,000 |
| Melt flow rate of vinyl-based copolymer (III) | g/10 min | 274 | 274 | 274 | 274 | 274 | 274 | 274 |
| Melt flow rate of polycarbonate resin (I) | g/10 min | 32 | 32 | 32 | 32 | 32 | 32 | 32 |
| Melt flow rate ratio [(III)/(1)] of vinyl-based copolymer (III) to polycarbonate resin (I) | — | 9 | 9 | 9 | 9 | 9 | 9 | 9 |
| Silver appearance of molded product | — | 3 | 5 | 5 | 4 | 4 | 4 | 4 |
| Pellet melt flow rate (fluidity) | g/10 min | 36 | 80 | 92 | 51 | 52 | 56 | 60 |
| Charpy impact strength of molded product | kJ/m$^2$ | 8 | 5 | 4 | 4 | 5 | 7 | 7 |
| Deflection temperature under load of molded product | ° C. | 122 | 102 | 96 | 112 | 112 | 112 | 111 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Polycarbonate resin (I) | I-1 (part by weight) | 45 |  |  |  |  |  |
|  | I-2 (part by weight) | 30 | 19 | 35 | 37.5 | 75 | 75 |
|  | I-3 (part by weight) |  | 56 | 40 | 37.5 |  |  |
| Graft copolymer (II) | II-1 (part by weight) | 7 | 7 | 7 | 7 | 7 | 7 |
|  | II-2 (part by weight) |  |  |  |  |  |  |
| Vinyl-based copolymer (III) | III-1 (part by weight) |  |  | 6 |  |  |  |
|  | III-2 (part by weight) |  |  |  |  |  |  |
|  | III-3 (part by weight) | 6 | 6 |  |  | 6 | 6 |
|  | III-4 (part by weight) |  |  |  |  |  |  |
|  | III-5 (part by weight) |  |  |  | 6 |  |  |
| Inorganic filler (IV) | IV-1 (part by weight) | 12 | 12 | 12 | 12 | 12 | 12 |
|  | IV-2 (part by weight) |  |  |  |  |  |  |
| Phosphoric acid ester-based compound (V) | V (part by weight) | 4 | 4 | 4 | 4 | 0 | 13 |
| Weight average molecular weight of vinyl-based copolymer (III) | — | 99,000 | 99,000 | 90,000 | 115,000 | 99,000 | 99,000 |
| Melt flow rate of vinyl-based copolymer (III) | g/10 min | 274 | 274 | 297 | 209 | 274 | 274 |
| Melt flow rate of polycarbonate resin (I) | g/10 min | 53 | 19 | 22 | 24 | 32 | 32 |
| Melt flow rate ratio [(III)/(I)] of vinyl-based copolymer (III) to polycarbonate resin (I) | — | 5 | 14 | 14 | 9 | 9 | 9 |
| Silver appearance of molded product | — | 2 | 5 | 5 | 5 | 1 | 5 |
| Pellet melt flow rate (fluidity) | g/10 min | 87 | 29 | 29 | 29 | 30 | 111 |
| Charpy impact strength of molded product | kJ/m$^2$ | 2 | 9 | 7 | 9 | 9 | 2 |
| Deflection temperature under load of molded product | ° C. | 110 | 113 | 112 | 113 | 125 | 87 |

Although our compositions and molded articles have been described in detail and with reference to particular examples, it will be apparent to those skilled in the art that various changes and modifications can be made without departing from the spirit and scope of this disclosure. This application is based on Japanese Patent Application No. 2019-58158 filed on Mar. 26, 2019, contents of which are incorporated herein by reference.

INDUSTRIAL APPLICABILITY

Our thermoplastic resin composition prevents the silver appearance of the molded product and has excellent fluidity, and is thus suitable for use in automobile exterior parts such as rear spoilers, hubcaps, door mirrors, and radiator grilles, automobile interior parts such as power window panels, center consoles, center clusters, lever controllers, and console boxes, and automobile exterior parts such as rear spoilers, grilles, garnishes, door mirrors, roofs, fenders and bumpers in the field of automobiles. In addition to the field of automobiles, our thermoplastic resin compositions can also be suitably used in fields such as OA equipment, home appliances, housing building materials, suitcases and bags.

The invention claimed is:

1. A thermoplastic resin composition comprising: a polycarbonate resin (I); a graft copolymer (II); a vinyl-based copolymer (III); an inorganic filler (IV); and an aromatic condensed phosphoric acid ester (V), wherein:

the graft copolymer (II) is at least one of a graft copolymer (II-1) obtained by graft polymerization of a monomer mixture containing at least an aromatic vinyl-based monomer and a vinyl cyanide-based monomer in a presence of a diene-based rubbery polymer and a graft copolymer (II-2) obtained by graft polymerization of a monomer mixture containing at least an aromatic vinyl-based monomer and a vinyl cyanide-based monomer in a presence of an acrylic rubbery polymer obtained by polymerizing an acrylic acid ester-based monomer and a polyfunctional monomer;

the vinyl-based copolymer (III) has a weight average molecular weight of 110,000 or less;

a ratio (($III_{MF}$)/($I_{MF}$)) of a melt flow rate ($III_{MF}$) (g/10 min) (240° C., 10 kg) of the vinyl-based copolymer (III) to a melt flow rate ($I_{MF}$) (g/10 min) (temperature: 240° C., load: 10 kg) of the polycarbonate resin (I) is 7 or more and 12 or less; and a blending amount of the aromatic condensed phosphoric acid ester (V) is 1 to 10 parts by weight with respect to 100 parts by weight of a total amount of (I) to (IV).

2. The thermoplastic resin composition according to claim 1, wherein the inorganic filler (IV) is at least one of talc and wollastonite.

3. A molded product obtained by molding the thermoplastic resin composition according to claim 1.

4. The thermoplastic resin composition according to claim 1, comprising no crystalline resin.

* * * * *